US006803150B1

(12) United States Patent
Iriyama et al.

(10) Patent No.: US 6,803,150 B1
(45) Date of Patent: Oct. 12, 2004

(54) NONAQUEOUS ELECTROLYTE SECONDARY CELL, METHOD FOR MANUFACTURING THE SAME, AND CARBONACEOUS MATERIAL COMPOSITION

(75) Inventors: Jiro Iriyama, Tokyo (JP); Tamaki Nakahashi, Tokyo (JP); Tomoyuki Ohta, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/763,409

(22) PCT Filed: Aug. 26, 1999

(86) PCT No.: PCT/JP99/04607

§ 371 (c)(1),
(2), (4) Date: Feb. 22, 2001

(87) PCT Pub. No.: WO00/13245

PCT Pub. Date: Mar. 9, 2000

(30) Foreign Application Priority Data

Aug. 27, 1998 (JP) ........................................... 10/241916
Jun. 23, 1999 (JP) ........................................... 11/177099

(51) Int. Cl.$^7$ ......................... H01M 4/58; H01M 4/60; H01M 6/00; H01B 1/04; C01B 31/00
(52) U.S. Cl. ................... 429/231.8; 429/213; 252/502; 423/414; 29/623.5
(58) Field of Search .............................. 429/231.8, 209, 429/213; 252/502; 423/414; 29/623.5

(56) References Cited

U.S. PATENT DOCUMENTS

| 5,075,036 | A | * | 12/1991 | Parish et al. ................. 252/511 |
| 5,340,670 | A | * | 8/1994 | Takami et al. ............... 429/194 |
| 5,451,477 | A | | 9/1995 | Omaru |
| 5,723,232 | A | * | 3/1998 | Yamada et al. ............. 429/245 |
| 5,879,417 | A | | 3/1999 | Yamada |
| 5,908,715 | A | | 6/1999 | Liu |
| 5,965,296 | A | * | 10/1999 | Nishimura et al. ....... 429/231.8 |
| 6,482,547 | B1 | * | 11/2002 | Yoon et al. ............... 429/231.8 |

FOREIGN PATENT DOCUMENTS

| JP | 06-84516 | 3/1994 |
| JP | 07-192742 | 7/1995 |
| JP | 07-326343 | 12/1995 |
| JP | 09/17418 | 1/1997 |
| JP | 09-27314 | 1/1997 |
| JP | 09-27316 | 1/1997 |
| JP | 09-306477 | 11/1997 |
| JP | 10-162858 | 6/1998 |
| JP | 11-31508 | 2/1999 |
| JP | 11-73990 | 3/1999 |

OTHER PUBLICATIONS

Carbon Black. Encyclopedia Britannica. http://www.britannica.com/eb/article?eu=20556.*

* cited by examiner

*Primary Examiner*—Patrick Ryan
*Assistant Examiner*—Julian Mercado
(74) *Attorney, Agent, or Firm*—Sughrue Mion, PLLC

(57) ABSTRACT

A rechargeable nonaqueous electrolyte secondary battery has a positive electrode which can be doped with lithium ions and de-doped thereof, a nonaqueous electrolyte solution and a negative electrode. The negative electrode active material is a carbon material including at least two component: (a) flake graphite particles; and (b) a non-flake graphite material whose surface is covered with amorphous carbon. This secondary battery has a high capacity and is excellent charging/discharging efficiency.

18 Claims, 1 Drawing Sheet

NONAQUEOUS ELECTROLYTE SECONDARY CELL, METHOD FOR MANUFACTURING THE SAME, AND CARBONACEOUS MATERIAL COMPOSITION

BACKGROUND OF THE INVENTION (i) Field of the Invention

The present invention relates to a high-performance nonaqueous electrolyte secondary battery using an organic solvent as an electrolyte solution, and more particularly, it relates to a negative electrode material for a lithium ion secondary battery.

(ii) Description of the Related Art

In recent years, as a power supply of a portable electronic device, demands for a secondary battery having a high energy density and excellent charge and discharge cycle properties are increasing. In this regard, the nonaqueous electrolyte secondary battery, especially a lithium ion secondary battery is very expected as a battery having a high voltage and a high energy density.

In particular, much attention has been nowadays paid to a battery system using a lithium-containing transition metal oxide as a positive electrode active material and a carbonaceous material as a negative electrode. For both positive and negative electrodes of this battery, there is utilized a mechanism of lithium ion intercalation, deintercalation, lithium ion doping or de-doping with respect to each active material, and hence, no metal lithium dendrite is formed even if the charge and discharge cycles are repeated, in contrast to a battery using metal lithium. This battery is, therefore, expected to exert the excellent charge and discharge cycle properties and safety.

At present, a carbon material is widely used as a negative electrode material for such a nonaqueous electrolyte secondary battery. As a proposal of using the carbon material as the negative electrode material, each of Japanese Patent Applications Laid-Open Nos. 208079/1982, 102464/1983, 192266/1983, 143280/1984 and 54181/1985 discloses the employment of, e.g., graphite as the negative electrode material. However, the crystallite of graphite is in the extremely developed state, and so, in the nonaqueous electrolyte secondary battery using such a negative electrode, the decomposition of the electrolyte solution is apt to occur as a side reaction at the hexagonal mesh surface ends of graphite crystals during charge, so that there is a problem that a charge and discharge efficiency and the charge and discharge cycle properties are poor.

In order to solve such a problem, there has been proposed the use of a carbon material which has a low graphitization degree and whose crystallite is not in the extremely developed state. Specifically, it has been suggested that the graphitization degree can be controlled by a calcination temperature, and a method using, as the negative electrode, a calcined organic material obtained at a calcination temperature of not more than 1500° C. is disclosed in Japanese Patent Applications Laid-Open Nos. 93176/1993 and 235372/1985. In such a carbon material having the low graphitization degree, the decomposition of the electrolyte solution during charge can be more suppressed as compared with a carbon material calcined at a temperature not less than 2800° C. and having the high graphitization degree.

The carbon material having the low graphitization degree has, however, lower charge and discharge efficiency than the material having the high graphitization degree, and its true density is also low. Therefore, the obtained battery energy density becomes low, which is insufficient as a battery capacity.

Accordingly, each of Japanese Patent Applications Laid-Open Nos. 059703/1998, 343196/1996, 368778/1992 and 66404/1992 discloses an attempt to suppress the side reaction such as decomposition of the electrolyte solution to thereby improve the battery properties by coating the surface of the carbon material with amorphous carbon or carbonaceous decomposition components to reduce the surface area of the carbon material or covering the hexagonal mesh surface end of the active graphite crystal.

Further, Japanese Patent Application Laid-Open No. 2428905/1993 discloses an attempt to suppress the side reaction such as decomposition of the electrolyte solution to thereby improve the battery properties by restricting a ratio of particles which have a small particle diameter to reduce the surface area of the graphite material.

When using the graphite material to a negative electrode of the nonaqueous electrolyte secondary battery, since a main cause of the irreversible capacity of the battery is the decomposition reaction of the electrolyte solution which occurs at the edge surface of the graphite crystal during charge, reducing the surface area of the negative electrode material or covering the material surface with the electrolyte solution and the inactive coating film are effective for improving the charge and discharge efficiency.

In general, as a technique for working the carbon particles into an electrode, there is widely used a method which comprises mixing the carbon particles with a binder, dispersing the resultant mixture in an aqueous or organic solvent to obtain a slurry, applying this slurry on a current collector, and then drying the same. The negative electrode manufactured by this method has, however, a high void ratio and small filling density as it is, and hence the energy density of the battery can not be sufficiently increased.

In particular, since the material from which the carbon particles having a small particle diameter are removed for reducing the specific surface area has inferior filling properties, it is hard to increase the electrode density. Therefore, the electrode manufactured by the above-described method is usually compressed by using a roll press machine or a uniaxial press machine in order to increase the filling density.

In case of manufacturing the electrode by using the conventional carbon material, however, when the electrode is tried to be compressed in the manufacturing process, the improvement effect is decreased and the charge and discharge halo efficiency becomes lower. Thus, the battery in which such a carbon material is used for the electrode can not be compressed to sufficiently increase the filling density of the electrode, and the energy density of the battery becomes lower, which leads to the insufficient battery capacity.

The present inventor has discovered that the reason for the fact that the charge and discharge efficiency lowers by pressure compression of the electrode is due to the increase in the specific surface area of the electrode. Since compressing the electrode decreases the void ratio of the electrode, the surface area of the electrode is seemingly reduced. However, when the electrode is compressed to, the specific surface area of the electrode is surprisingly greatly increased.

That is because compressing the electrode causes the carbon particles to be fragmentized. When the carbon particles are fragmentized, the specific surface area of the electrode is increased, which readily provokes decomposition reaction of the electrolyte solution, thereby lowering the charge and discharge efficiency. Further, in case of the graphite material having the surface covered with amorphous carbon, when the carbon particles are fragmentized, the active carbon hexagonal mesh surface edge which is not covered with amorphous carbon is exposed, and the effect obtained by coating is thus reduced. Therefore, deterioration of the charge and discharge efficiency due to compression becomes prominent.

Moreover, Japanese Patent application Laid-Open No. 214615/1998 discloses that before the adhesion of amorphous carbon onto the surfaces of the graphite particles, the graphite particles are treated with potassium permanganate, which permits amorphous carbon to further firmly adhere thereto. It was, however, difficult to increase the filling density without deteriorating the charge and discharge effect by this method.

Japanese Patent Application Laid-Open No. 27316/1997 discloses that the graphite-based carbon and amorphous carbon are mixed to be used as a negative electrode active material. Additionally, Japanese Patent Application Laid-Open No. 153514/1996 discloses that a multilayer film having a graphite layer and an amorphous carbon layer or a film formed of a mixture containing graphite and amorphous carbon is used as a negative electrode. Although these examples achieve their own objects, they are different from an object of the present invention, i.e., efficiently bringing out the properties of the graphite material whose surface is covered with amorphous carbon which causes no side reaction such as decomposition of the electrolyte solution.

DISCLOSURE OF THE INVENTION

In view of the above-described problems, it is an object of the present invention to provide a high-performance non-aqueous electrolyte secondary battery having the excellent charge and discharge efficiency.

The present invention is directed to a rechargeable nonaqueous electrolyte secondary battery comprising a positive electrode which can be doped with lithium ions and de-doped of lithium ions, a nonaqueous electrolyte solution and a negative electrode, wherein a negative electrode active material consists essentially of a carbon material (which may be referred to as a "negative electrode carbon material" for clarification hereinafter) including at least two component: (a) flake graphite particles; and (b) a non-flake graphite material whose surface is covered with amorphous carbon.

Moreover, the present invention is also directed to a method for manufacturing a nonaqueous electrolyte secondary battery, said method comprising steps of: applying a slurry onto a current collector; the slurry comprising (a) flake graphite particles, (b) a non-flake graphite material whose surface is covered with amorphous carbon, a binder, and a dispersion medium; drying the slurry; and compressing the dried slurry by the application of a pressure.

Furthermore, the present invention is directed to a carbon material composition comprising: (a) flake graphite particles; and (b) a non-flake graphite material whose surface is covered with amorphous carbon; a weight ratio of (a) to (b) being 10:90 to 70:30.

According to examination by the present inventor, as described above, in case of manufacturing a negative electrode by using the covered graphite material as a negative electrode active material, when the negative electrode active material is compressed in order to increase the filling density, the active carbon hexagonal mesh surface edge which is not covered with amorphous carbon is exposed, deterioration of the charge and discharge efficiency due to compression is extremely large.

On the other hand, the flake graphite particles have a small friction coefficient, which is preferable for increasing the filling density. However, when only the flake graphite particles are used as the negative electrode active material, the graphite particles are uniformly oriented by pressure compression. Which leads to degradation of the wettability of the electrode and the electrolyte solution. Therefore, the negative electrode hardly impregnates with the electrolyte solution, and the coefficient of effective utilization is hence decreased, thereby reducing the capacity of the battery.

As a countermeasure, the present invention uses both the non-flake graphite material those surface is covered with amorphous carbon and the flake graphite particles to be mixed. As a result as compared with the case where the graphite material whose surface is covered with amorphous carbon is solely used, the filling density can be increased with a smaller pressure, and it is possible to suppress deterioration of the battery properties due to fracture of the graphite particles whose surfaces are covered with amorphous carbon. Since the flake graphite particles have a small friction coefficient (it can be considered that they function as cushions because they are squashy), the friction resistance between the graphite material particles whose surfaces are covered with amorphous carbon becomes small, and whereby the particles are apt to be shifted from each other during compression, increasing the filling properties. Therefore, the negative electrode according to the present invention can sufficiently increase the density with a small pressure, and fracture of the graphite particles whose surfaces are covered with amorphous carbon can be suppressed.

Since it is possible to absorb the uniform orientation of the flake graphite particles during pressure compression, appropriate irregularities can be formed on the surface of the negative electrode. Therefore, the negative electrode according to the present invention is superior in the wettability to the electrolyte solution, as compared with the negative electrode using only the flake graphite particles as the negative electrode active material.

Therefore, according to the[]present invention, it is possible to obtain a high-performance nonaqueous electrolyte secondary battery which exerts a high charge and discharge efficiency.

BRIEF DESCRIPTION OF THE SYMBOLS

Figure 1:
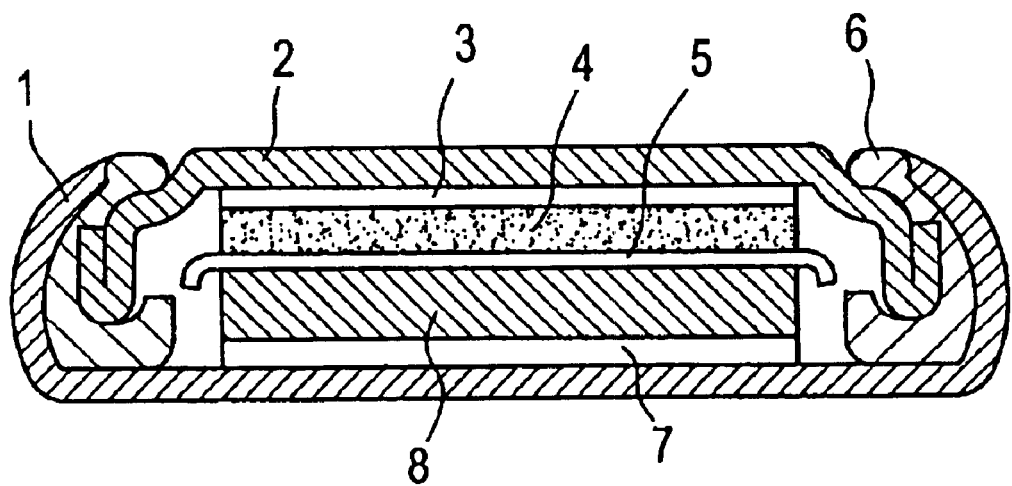
FIG. 1 is a cross-sectional view showing an embodiment of a nonaqueous electrolyte secondary battery according to the present invention.

1: Positive electrode case
2: Negative electrode case
3: Negative electrode current collector
4: Negative electrode active material
5: Separator
6: Gasket
7: Positive electrode current collector
8: Positive electrode active material

BEST MODE FOR CARRYING OUT THE INVENTION

As a method for obtaining a non-flake graphite material whose surface is covered with amorphous carbon (which may be also simply referred to as a "graphite material whose surface is covered with amorphous carbon" hereinafter) used in the present invention, there is a method including[ ]a step of mixing a graphite material such as natural graphite or artificial graphite using petroleum pitch or coal pitch as a raw material and a petroleum pitch or coal tar pitch and a step of calcining at 2500 to 3000° C. Alternately, the graphite material whose surface is covered with amorphous carbon can be similarly obtained by thermally decomposing fused hydrocarbon such as benzene or xylene by the CVD method to deposit on the surface of the graphite material. It is to be noted that the graphite material whose surface is covered with amorphous carbon for use in the present invention can be recognized as particles (or agglomerates) having a fixed size such as a granulated type, an aggregated type or a fiber type and is different from those which can be recognized as a film. In addition, this graphite material is morphologically definitely distinguished from the later-described flake graphite particles. The particle diameter (weight average) of the graphite material whose surface is covered with amorphous carbon is not restricted to a certain value as long as it is within a range which is free from problems in the manufacturing process of the electrode. Further, in case of the granulated or aggregated type, the particle diameter is, e.g., approximately 10 to 80 $\mu$m. In case of the fiber type, the diameter of the fiber (the thickest part in the cross section) is, e.g., approximately 3 to 20 $\mu$m.

Additionally, as a most preferable graphite material whose surface is covered with amorphous carbon for use in the present invention, there is a material which is obtained by graphitizing mesocarbon microbeads (mesophase pitch based carbon microbeads) at 2500 to 3000° C. The mesocarbon microbeads can be obtained by subjecting coal tar pitch and the like to heat treatment at a temperature of approximately 350 to 450° C., separating the generated spherulite by a method such as centrifugation and cleaning it by using a solvent such as toluene or xylene. The ground substance content such as pitch remains on the surface of the mesocarbon microbeads. After carbonizing this at approximately 800 to 1500° C., it is calcined at 2500 to 3000° C. During this calcination, the ground substance content such as pitch on the surface becomes amorphous carbon, and the internal mesocarbon microbeads become the graphite material having the high crystallinity. In the case of such a material, since amorphous carbon coat can be naturally generated in the manufacturing process, the afore-mentioned coat generation process can be omitted.

As the specific surface area of the graphite material whose surface is covered with amorphous carbon, 0.3 m²/g to 3 m²/g is preferable. When the specific surface area is smaller than 3 m²/g, decomposition of the electrolyte solution can be sufficiently suppressed, thereby further improving the charge and discharge efficiency. In addition, when the specific surface area is set equal to or larger than 0.3 m²/g, the sufficiently high rate properties (i.e., reduction in the capacity is small even if the current for charge and discharge is increased) can be readily obtained. In particular, 0.5 m²/g to 1 m²/g is more preferable.

The examples of the flake graphite particles for use in the present invention include graphite particles obtained by heat-treating at a high temperature of not less than 2500° C. an easily graphitizable material obtained from petroleum pitch coke or coal pitch coke, and natural graphites produced in China and Madagascar. In particular, since artificial graphite obtained by graphitizing needle coke or fluid coke using petroleum pitch or coal pitch as a raw material has a smaller amount of impurities than the natural graphite, the former is desirably superior in the charge and discharge efficiency.

Each flake graphite particle has a plane portion and a side surface portion and is definitely distinguished from the graphite particle having any other shape, e.g., granulated, aggregated, fiber type or fish scale-like graphite particle. Furthermore, in the flake graphite particles for use in the present invention, the shape of the primary particles should be flake, and the particles may be in the form of the secondary particles.

Moreover, as the weight average particle diameter, 10 $\mu$m to 80 $\mu$m is preferable. Taking the filling properties into consideration, 10 $\mu$m to 40 $\mu$m is particularly preferable. The particle diameter in this case has a Value obtained by the laser diffraction method. When the weight average particle diameter is not more than 80 $\mu$m, the effect for improving the filling properties can be sufficiently obtained, thereby increasing the negative electrode density. In addition, when the weight average particle diameter is not less than 10 $\mu$m, the specific surface ratio does not excessively become larger, which does not lead do the deteriorated charge and discharge efficiency.

In the present invention, the flake graphite particles whose surfaces are covered with amorphous carbon can be used to thereby obtain the similar effect. In such a case, the surface area may be decreased, which may improve the battery properties. On the other hand, when amorphous carbon on the surface is excessively thick, the cushion properties may be decreased, which is also disadvantageous in terms of cost. It is, therefore, preferable to use the above-described flake graphite particles as they are (the surfaces are not covered with amorphous carbon). It is to be noted that the surfaces of the flake graphite particles can be covered with amorphous carbon by mixing the flake graphite particles with petroleum pitch or coal tar pitch to be calcinated at 2500 to 3000° C., or thermally decomposing the fused hydrocarbon such as benzene or xylene by the CVD method to deposit on the surfaces of the flake graphite particles.

In the present invention, a blend ratio between the graphite material whose surface is covered with amorphous carbon and the flake graphite particles is important. Additionally, the amount of the flake graphite particles are preferably in a range of 10 to 70 wt % of the total weight of the negative electrode carbon material (however, the total weight means a sum total of the both materials if the carbon material consists of only the graphite material whose surface is covered with amorphous carbon and the flake graphite particles), and particularly preferably 20 to 45 wt %.

Since the effect for improving the filling properties can be sufficiently obtained with a blend ratio of not less than 10 wt %, the energy density of the battery can be increased. When the blend ratio is not more than 70 wt %, the wettability of the electrode and the electrolyte solution can be prominently improved, and the coefficient of effective utilization of the active material can be increased, thereby enlarging the capacity of the battery.

The carbon material for use in the present invention can contain any other carbon material than the graphite material having the surface covered with amorphous carbon and the flake graphite particles, and a carbon material such as acetylene black which can be typically used as a conductivity enhancing material may be contained. In this case, any other carbon material preferably corresponds to 3% or less of all the negative carbon materials.

In order to form the negative electrode used in the present invention, a usual method can be used. Predetermined amounts of the graphite material having the surface covered with amorphous carbon and the flake graphite particles are mixed with a later-described binder in an appropriate dispersion solvent. The obtained slurry is applied onto a current collector, the solvent is dried, and the resultant layer is then compressed and molded by using an adequate press machine.

The present invention can adopt a relatively low pressure as a press pressure. It is possible to sufficiently attain 1.3 to 1.8 (g/cc) which is the usually required filling density with a pressure smaller than a necessary pressure in the prior art (more than 8 ton/cm$^2$ and equal to approximately 10 ton/cm$^2$). It is sufficient to use even a pressure less than 3 ton/cm$^2$ depending on a content of the flake graphite.

As a positive electrode for use in the present invention which permits doping with lithium ions and de-doping, a lithium containing composite oxide is preferable. There are, for example, $LiCoO_2$, $LiNiO_2$, $LiMn_2O_4$, $LiFeO_2$, and others or those obtained by replacing part of these Co, Ni, Mn and Fe with other metal elements.

Examples of an organic solvent for the electrolyte solution for use in the present invention include ethers, ketones, lactones, sulfolane-based compounds, esters and carbonates. Typical examples of these materials include tetrahydrofuran, 2-methyl-tetrahydrofuran, γ-butyl lactone, acetonitrile, dimethoxyethane, diethyl carbonate, propylene carbonate, ethylene carbonate, dimethyl sulfoxide, sulfolane, 3-methylsulfolane, ethyl acetate, methyl propionate and mixed solvents of these materials.

No particular restriction is put on the electrolyte salt for use in the present invention, but usable are $LiBF_4$, $LIASF_6$, $LIPF_6$, $LiClO_4$, $CF_3SO_3Li$ and the like. Among these, $LiBF_4$, $LiClO_4$, $LiPF_6$ and the like are preferable in view of the battery properties, handling safety and others.

As a current collector, a metal foil such as a copper foil, a carbon sheet or a metal mesh can be used.

No particular restriction is put on a binder which can be used for binding the electrode material to the current collector, but usable are polytetrafluoroethylene, polyethylene, nitrile rubber, polybutadiene, butyl-rubber, polystyrene, styrene/butadiene rubber, nitrocellulose, cyanoethyl cellulose, and polymers of vinyl fluoride or vinylidene fluoride and the like. Although an amount of the binder is not restricted, it is within a range of 0.1 to 20 wt %, more preferably 3 to 15 wt % with respect to 100 wt % of the active material.

No particular restriction is put on the separator, but for example, a single sheet of fine porous film of a polyolefin such as polyethylene or polypropylene, or a laminate sheet of such films can be used.

Although the shape of the battery is not particularly restricted, there can be selected, e.g., a cylindrical, an angular or a coin-like shape.

On the other hand, the carbon material composition according to the present invention includes (a) flake graphite particles and (b) a non-flake graphite material having the surface covered with amorphous carbon described above, where the ratio of (a) and (b) is 10:90 to 70:30 in terms of the weight ratio. This composition can contain any other carbon material similarly as described above and may contain any other carbon material such as acetylene black generally used as a conductive providing member. In this case, any other carbon material is preferably not more than 3% of all the carbon material components. This composition can be preferably used as a negative electrode material of the nonaqueous electrolyte secondary battery.

EXAMPLES

The present invention will now be described in detail on the basis of examples and comparative examples, the scope of the present invention should not be restricted thereto.

A material (HAG-5P) obtained by mixing artificial graphite (HAG-5) manufactured by Nihon Kokuen Co., Ltd. with petroleum pitch and heat-treating the mixture at 2800° C. was used as a graphite material having the surface covered with amorphous carbon. Natural graphite (NG-15) manufactured by Kansai Netsukagaku Co., Ltd. was used as flake graphite particles. With these material a negative electrode was produced. When the specific surface area of HAG-5P was measured by a B.E.T. method using a Quantasorb manufactured by Quantachrome Corp., a value of 3.7 m$^2$/g was obtained. Nitrogen was used as absorption gas, and the carbon material was heated in the nitrogen atmosphere at 150° C. before measurement to remove the adsorbates on the surface.

When the size distribution of NG-15 was measured by the laser diffraction method using an automatic size distribution measuring device manufacturing by Horiba, the weight average particle diameter was 14.7 μm.

HAG-5P and NG-15 were mixed at a mixture ratio such as shown in Table 1 and used as a negative electrode active material. 12 wt % of the polyvinylidene fluoride manufactured by Kureha Chemical Industry Co., Ltd. was added to this carbon material to be used as a negative electrode material. This negative electrode material was dispersed in the N-methyl-2-pyrrolidone to obtain a slurry, and the obtained slurry was applied on a copper foil and then dried. The thus treated foil was further compressed by a uniaxial press machine to regulate a filling density to not less than 1.45 g/cc, thereby obtaining a negative electrode sheet.

The surface area of the negative electrode sheet was measured by the B.E.T. method using a Quantasorb manufactured by Quantachrome Corp. Table 1 shows the filling density and the specific surface area of each negative electrode after pressure formation and the pressure of the uniaxial press. Here, the filling density of the negative electrode means the apparent density of only the negative electrode mixture from which the copper foil as a current collector is removed. The negative electrode filling density can be readily obtained by measuring the weight and the thickness of an electrode having an arbitrary area and subtracting a value of the copper film as the current collector from the measurement value. Also, the specific surface area of the negative electrode means a value obtained by dividing the surface area of the negative electrode sheet measured by the above-described method by the weight of the negative electrode from which the current collector is removed.

Based on Table 1, it is understood that the pressure required for obtaining the filling density of the negative electrode which is not less than 45 g/cc is suddenly decreased when an amount of the flake graphite particles (NG-15) becomes not less than 10 wt %. It is also found that the specific surface area of the negative electrode after pressure compression becomes minimum when an amount of the flake graphite particles is 30 wt %.

| Negative Electrode Number | HAG-5P/ NG-15 | Negative Electrode Filling Density (g/cc) | Pressing Pressure (ton/cm$^2$) | Specific Surface Area of Negative Electrode (m$^2$/g) |
|---|---|---|---|---|
| 1 | 95/5 | 1.46 | 8.0 | 4.1 |
| 2 | 90/10 | 1.47 | 4.5 | 3.4 |
| 3 | 70/30 | 1.50 | 3.4 | 2.1 |
| 4 | 50/50 | 1.49 | 3.0 | 2.6 |

-continued

| Negative Electrode Number | HAG-5P/ NG-15 | Negative Electrode Filling Density (g/cc) | Pressing Pressure (ton/cm$^2$) | Specific Surface Area of Negative Electrode (m$^2$/g) |
|---|---|---|---|---|
| 5 | 30/70 | 1.50 | 2.1 | 3.1 |
| 6 | 10/90 | 1.52 | 1.8 | 3.5 |

Examples 1 to 6

Coin type nonaqueou electrolyte solution secondary batteries were prepared by using negative electrodes of negative electrode numbers 1 to 6 as Examples 1 to 6. The respective example numbers and negative electrode numbers used therefor correspond to each otter. To obtain a positive electrode, Lithium cobaltrate (LiCoO$_2$) was mixed with 5 wt % of polyvinylidene fluoride manufactured by Kureha Chemical Industry Co., Ltd., 1 wt % of acetylene black and 4 wt % of artificial graphite SP8 manufactured by Nihon Kokuen Co., Ltd., and the resultant mixture was then dispersed in N-methyl-2-pyrrolidone to obtain a slurry. This slurry was applied onto an aluminum foil and then dried, and the resultant layer was further compressed by a uniaxial press machine to obtain a positive electrode.

A mixed solvent (a mixing volume ratio: EC/PC/DMC= 20/20/60) of ethylene carbonate (EC), propylene carbonate (PC) and dimethyl carbonate (DMC) in which LiClO$_4$ having a g/cc (g/cc) and a negative electrode specific surface area of 5.8 (m$^2$/g). The same procedure as in Example 1 was carried out using this negative electrode, thereby preparing a coin type nonaqueous electrolyte secondary battery, and its charge and discharge properties were then measured. The results are shown in Table 2.

Comparative Example 1

The same procedure as in the preparation of negative electrode numbers 1 to 6 was conducted except that HAG-5P alone was used as a negative electrode active material, and pressed under a pressing pressure of 8.2 (ton/cm$^2$) to obtain a negative electrode having a negative electrode filling density of 1.45 g/cc (g/cc) and a negative electrode specific surface area of 5.8 (cm$^2$/g). The same procedure as in Example 1 was carried out using this negative electrode, thereby preparing a coin type nonaqueous electrolyte secondary battery, and its charge and discharge properties were then measured. The results are shown in Table 2.

Comparative Example 2

The same procedure as in the preparation of negative electrode numbers 1 to 6 was conducted except that NG-15 alone was used as a negative electrode active material, and pressed under a pressing pressure of 1.0 (ton/cm$^2$) to obtain a negative electrode having a negative electrode filling density of 1.48 g/cc (g/cc) and a negative electrode specific surface area of 6.3 (m$^2$/g). The same procedure as in Example 1 was carried out using this negative electrode, thereby preparing a coin type nonaqueous secondary battery, and its charge and discharge properties were then measured. The results are shown in Table 2.

TABLE 2

| | Negative Electrode Number | Charge and Discharge Efficiency | Discharge Capacity (mAh/g) |
|---|---|---|---|
| Example 1 | 1 | 0.74 | 228 |
| Example 2 | 2 | 0.82 | 258 |
| Example 3 | 3 | 0.87 | 305 |
| Example 4 | 4 | 0.85 | 307 |
| Example 5 | 5 | 0.81 | 303 |
| Example 6 | 6 | 0.71 | 271 |
| Comparative Example 1 | Only HAG-5P | 0.65 | 212 |
| Comparative Example 2 | Only NG-15 | 0.56 | 180 |

As apparent from Table 2, in the examples according to the present invention, it is possible to obtain the high-performance nonaqueous electrolyte secondary battery which exerts a charge and discharge efficiency of not less than 0.70 and a discharge capacity of not less than 220 mAh/g even if the negative electrode filling density is not less than 1.45 g/cc. Particularly, in Examples 2 to 5 in which the mixing ratio of NG-15 is within a range of 10 to 70% of the entire negative electrode carbon in terms of the weight ratio, it is possible to obtain the high-performance nonaqueous electrolyte secondary battery which exerts a charge and discharge efficiency of not less than 0.80 and a discharge capacity of not less than 250 mAh/g.

Example 7

A material obtained by graphitizing mesocarbon microbeads (MCMB30-28, manufactured by Osaka Gas Co., Ltd., specific surface area=0.98 m$^2$/g) was used as a graphite material whose surface was covered with amorphous carbon, and artificial graphite (SFG75, manufactured by Lonza Co., Ltd., average particle diameter=34.3 μm) obtained from coal pitch as a raw material was used as flake graphite particles. MCMB30-28 and SFG75 were mixed so that a ratio of MCMB30-28 in a negative electrode carbon material might be 75 wt % and a ratio of SFG75 in the same might be 25 wt % of the total, thereby obtaining a negative electrode active material.

The same procedure as in Example 1 was conducted using this negative electrode active material to form a negative electrode. A filling density of the negative electrode was regulated to not less than 1.6 g/cc by the use of a uniaxial press. A pressing pressure of 2.6 (ton/cm$^2$) was used to obtain a negative electrode having a negative electrode filling density of 1.64 (g/cc) and a negative electrode specific surface area of 1.7 (m$^2$/g).

To obtain a positive electrode, LiMn$_2$O$_4$ was mixed with 5 wt % of polyvinylidene fluoride manufactured by Kureha Chemical Industry Co., Ltd., 1 wt % of acetylene black and 4 wt % of artificial graphite SP8 manufactured by Nihon Kokuen Co., Ltd., and the resultant mixture was then dispersed in N-methyl-2-pyrrolidone to obtain a slurry. This slurry was applied onto an aluminum foil and then dried, and the resultant layer was further compressed by a uniaxial press machine to obtain a positive electrode.

A mixed solvent (a mixing volume ratio: EC/DEC=45/55) of ethylene carbonate (EC) and diethyl carbonate (DEC) in which LiClO$_4$ having a concentration of 1 mole/liter was dissolved was used as an electrolyte solution. A polypropylene non-woven fabric was used as a separator. A coin type electrolyte secondary battery was prepared by using these materials, and its battery properties were then measured in the same manner as in Example 1. The results are shown in Table 3.

Example 8

As in Example 7, a material obtained by graphitizing mesocarbon microbeads (MCMB3-28, manufactured by Osaka Gas Co., Ltd., specific surface area=4.62 $m^2/g$) was used as a graphite material whose surface was covered with amorphous carbon, and artificial graphite (SFG75, manufactured by Lonza Co., Ltd., average particle diameter=27.3 $\mu m$) prepared from coal pitch as a raw material was used as flake graphite particles. MCMB3-28 and SFG75 were mixed so that a ratio of MCMB3-28 might be 75 wt % and a ratio of SFG75 might be 25 wt % of all the negative electrode carbon materials, thereby obtaining a negative electrode active material. As in Example 7, this negative electrode active material was used under a pressing pressure of 2.4 (ton/$cm^2$) to obtain a negative electrode having a negative electrode filling density of 1.66 (g/cc) and a negative specific electrode surface area of 2.3 ($m^2/g$). As in Example 7, a coin type nonaqueous electrolyte secondary battery was prepared, and its battery properties were then measured. The results are shown in Table 3.

Example 9

As in Example 7, a material obtained by graphitizing mesocarbon microbeads (MCMB30-28, manufactured by Osaka Gas Co., Ltd., specific surface area=0.98 $m^2/g$) was used as a graphite material whose surface was covered with amorphous carbon, and artificial graphite (SFG15, manufactured by Lonza Co., Ltd., average particle diameter=6.1 $\mu m$) prepared from coal pitch as a raw material was used as flake graphite particles. MCMB30-28 and SFG6 were mixed so that a ratio of MCMB30-28 might be 75 wt % and a ratio of SFG15 might be 25 wt % of all the negative electrode carbon materials to obtain a negative electrode active material. The same procedure as in Example 7 was carried out except for the above requirements to prepare a coin type nonaqueous electrolyte secondary battery. As in Example 7, this negative electrode active material was used under a pressing pressure of 2.4 (ton/$cm^2$) to obtain a negative electrode having a negative electrode filling density of 1.62 (g/cc) and a negative electrode specific surface area of 2.2 ($m^2/g$). As in Example 7, the coin type nonaqueous electrolyte secondary battery was prepared, and its battery properties were then measured. The results are shown in Table 3.

Comparative Example 3

The same procedure as in Example 7 was conducted except that graphitized MCMB3-28 alone was used as a negative electrode active material, thereby preparing a coin type nonaqueous electrolyte secondary battery, and its battery properties were then measured. The results are shown in Table 3. However, a pressing pressure in the preparation of a negative electrode was 12.4 (ton/$cm^2$). In the thus prepared battery, a negative electrode filling density was 1.62 (g/cc) and a negative electrode specific surface area was 2.2 ($m^2/g$).

Comparative Example 4

The same procedure as in Example 7 was conducted except that SFG15 alone was used as a negative electrode active material, thereby preparing a coin type nonaqueous electrolyte secondary battery, and its battery properties were then measured. The results are shown in Table 3. However, a pressing pressure in the preparation of a negative electrode was 1.5 (ton/$cm^2$). In the thus prepared battery, a negative electrode filling density was 1.61 (g/cc) and a negative electrode specific surface area was 2.8 ($m^2/g$).

TABLE 3

|  | Charge and Discharge Efficiency | Discharge Capacity (mAh/g) | Negative Electrode Filling Density (g/cc) |
|---|---|---|---|
| Example 7 | 0.93 | 335 | 1.64 |
| Example 8 | 0.83 | 296 | 1.66 |
| Example 9 | 0.81 | 311 | 1.62 |
| Comparative Example 3 | 0.67 | 265 | 1.61 |
| Comparative Example 4 | 0.63 | 220 | 1.61 |

As apparent from Table 3, the battery according to Examples 7 and 8 in which the material obtained by graphitizing mesocarbon microbeads was used as the graphite material having the surface covered with amorphous carbon and the artificial graphite having coal pitch as a raw material was used as the flake graphite particles shows a excellent performance such as a charge and discharge efficiency of not less than 0.80 and a discharge capacity of not less than 290 mAh/g even if the negative electrode density is not less than 1.6 g/cc.

In particular, the battery according to example 7 in which the specific surface area of the graphite material having the surface covered with amorphous carbon is within a range of 0.3 $m^2/g$ to 3 $m^2/g$ and the average particle diameter of the flake graphite particles is within a range of 10 $\mu m$ to 80 $\mu m$ exerts an excellent performance such as a charge and discharge efficiency of not less than 0.90 and a discharge capacity of not less than 320 mAh/g.

According to the present invention, it is possible to provide the nonaqueous electrolyte secondary battery having the high capacity and the excellent charge and discharge efficiency.

What is claimed is:

1. A rechargeable nonaqueous electrolyte secondary battery comprising a positive electrode which can be doped with lithium ions and de-doped of lithium ions, a nonaqueous electrolyte solution and a negative electrode, wherein a negative electrode active material consists essentially of a carbon material including at least two components:
    (a) flake graphite particles; and
    (b) a non-flake graphite material whose surface is covered with amorphous carbon.

2. The nonaqueous electrolyte secondary battery according to claim 1, wherein a ratio of (a) said flake graphite particles is within a range of 10 to 70 wt % of all the carbon materials.

3. The nonaqueous electrolyte secondary battery according to claim 2, wherein the specific surface area of (b) said non-flake graphite material whose surface is covered with amorphous carbon is within a range of 0.3 $m^2/g$ to 3 $m^2/g$.

4. The nonaqueous electrolyte secondary battery according to claim 3, wherein (b) said non-flake graphite material whose surface is covered with amorphous carbon is obtained by graphitizing mesocarbon microbeads.

5. The nonaqueous electrolyte secondary battery according to claim 3, wherein said carbon material consists solely of (a) said flake graphite particles, and (b) said non-flake graphite material whose surface is covered with amorphous carbon.

6. The nonaqueous electrolyte secondary battery according to claim 2, wherein a weight average particle diameter of (a) said flake graphite particles is within a range of 10 $\mu m$ to 80 $\mu m$.

7. The nonaqeuous electrolyte secondary battery according to claim 6, wherein (a) said flake graphite particles are artificial graphite obtained from petroleum pitch or coal pitch as a raw material.

8. The nonaqeuous electrolyte secondary battery according to claim 6, wherein said carbon material consists solely of (a) said flake graphite particles, and (b) said non-flake graphite material whose surface is covered with amorphous carbon.

9. The nonaqueous electrolyte secondary battery according to claim 2, wherein said carbon material consists solely of (a) said flake graphite particles, and (b) said non-flake graphite material whose surface is covered with amorphous carbon.

10. The nonaqueous electrolyte secondary battery according to claim 1, wherein the specific surface area of (b) said non-flake graphite material whose surface is covered with amorphous carbon is within a range of 0.3 $m^2/g$ to 3 $m^2/g$.

11. The nonaqueous electrolyte secondary battery according to claim 10, wherein (b) said non-flake graphite material whose surface is covered with amorphous carbon is obtained by graphitizing mesocarbon microbeads.

12. The nonaqueous electrolyte secondary battery according to claim 10, wherein said carbon material consists solely of (a) said flake graphite particles, and (b) said non-flake graphite material whose surface is covered with amorphous carbon.

13. The nonaqueous electrolyte secondary battery according to claim 1, wherein a weight average particle diameter of (a) said flake graphite particles is within a range of 10 $\mu$m to 80 $\mu$m.

14. The nonaqueous electrolyte secondary battery according to claim 13, wherein (a) said flake graphite particles are artificial graphite obtained from petroleum pitch or coal pitch as a raw material.

15. The nonaqeuous electrolyte secondary battery according to claim 13, wherein said carbon material consists solely of (a) said flake graphite particles, and (b) said non-flake graphite material whose surface is covered with amorphous carbon.

16. The nonaqueous electrolyte secondary battery according to claim 1, wherein said carbon material consists solely of (a) said flake graphite particles, and (b) said non-flake graphite material whose surface is covered with amorphous carbon.

17. A method for manufacturing a nonaqueous electrolyte secondary battery, said method comprising steps of:

applying a slurry onto a current collector; the slurry comprising (a) flake graphite particles, (b) a non-flake graphite material whose surface is covered with amorphous carbon, a binder, and a dispersion medium;

drying the slurry; and compressing the dried slurry by the application of a pressure.

18. The method for manufacturing a nonaqueous electrolyte secondary battery according to claim 17, wherein a ratio of (a) said flake graphite particles is within a range of 10 to 70 wt % of all carbon materials in the slurry.

* * * * *